United States Patent [19]

Usui et al.

[11] Patent Number: 4,775,170
[45] Date of Patent: Oct. 4, 1988

[54] HOSE COUPLING ASSEMBLY

[75] Inventors: Masayoshi Usui; Kazunori Takigawa, both of Numazu; Katsushi Washizu, Sunto, all of Japan

[73] Assignee: Usui Kokusai Sangyo Kabushiki Kaisha, Nagasawa, Japan

[21] Appl. No.: 72,925

[22] Filed: Jul. 14, 1987

[30] Foreign Application Priority Data

Jun. 2, 1987 [JP] Japan .................................. 62-86143
Jun. 2, 1987 [JP] Japan .................................. 62-86144

[51] Int. Cl.$^4$ ............................................... F16L 37/12
[52] U.S. Cl. ..................................... 285/24; 285/319; 285/331; 285/370
[58] Field of Search ................... 285/319, 331, 24, 370

[56] References Cited

U.S. PATENT DOCUMENTS

| | | | |
|---|---|---|---|
| 177,686 | 5/1876 | Buzzell | 285/319 X |
| 1,875,330 | 9/1932 | Eisenman | 285/331 |
| 2,050,137 | 8/1936 | Walsh | 285/331 |
| 2,148,863 | 2/1939 | Key | 285/331 X |
| 2,284,216 | 5/1942 | Kunkel | 285/331 |
| 2,330,864 | 10/1943 | Bruno | 285/331 X |
| 3,394,954 | 7/1968 | Sarns | 285/319 |
| 3,455,579 | 7/1969 | Olliff, Jr. et al. | 285/319 X |
| 4,350,468 | 9/1982 | Julke | 285/331 X |
| 4,660,869 | 4/1987 | Gabus | 285/331 X |
| 4,679,827 | 7/1987 | Law | 285/319 X |

Primary Examiner—Thomas F. Callaghan
Attorney, Agent, or Firm—Anthony J. Casella; Gerald E. Hespos

[57] ABSTRACT

A hose coupling assembly comprising a joint body having a central fluid bore extending therethrough and an annular groove provided thereon at one end of the bore and coaxial with the bore. The joint body also has a tubular protrusion at the opposite end of the bore and to be coupled to a hose. An elastic seal ring is inserted into the groove and has a V-like groove therein. A tubular member has at one end an annular protrusion engaged in the V-like groove in the elastic ring and is coupled at the other end to another house. The joint body and the tubular member are held elastically by pawls provided on one of them in a removable manner and aligned automatically with each other by their unique structure.

1 Claim, 2 Drawing Sheets

HOSE COUPLING ASSEMBLY

BACKGROUND OF THE INVENTION

1. Field of the Invention

This invention relates generally to improvements to a coupling assembly which includes one coupling half which comprises a joint body for a relatively thin hose having a diameter of about 20 mm or less and the other coupling half which comprises, for example, a tubular coupling end member or a metal tube for another hose having an outer diameter of 20 mm or less to provide a supply passage through which oil or air is supplied to automobiles, various machines, equipment or the like.

2. Description of the Prior Art

Conventionally, for example as shown in FIG. 5, a coupling assembly of this type includes a joint body 21 which has an axial fluid bore 24 extending therethrough, a tubular protrusion 23 provided at one end and to be connected to a hose and an internally threaded hole 22 provided at the other end and having a large diameter. The joint body has a truncated conical seat 25 in the hole. The assembly also includes a flare type coupling end provided at one end of a metal tube P' and seated on the truncated conical seat, and a nut 26 turned into the internally threaded hole 22 to tighten the flare against the seat for coupling purposes.

However, this assembly requires a large push force to cause a face-to-face contact between the seat 25 and the flare, may bring about an uneven contact between the seat and the flare due to uneven worked surface of the flare, and has no function to align the seat and the flare. The mechanical strength of the flare will be degraded due to thinning, deformation and twisting of the flare caused by large push force applied to the flare and excessive uneven tightening of the flare. Thus, vibrations of an engine, a machine, equipment or the like concerned may easily cause cracks or breakage in the neck of the flare to thereby cause leakage of air or oil. Tightening the nut, especially by the use of a coupling tool in a narrow space, is troublesome.

SUMMARY OF THE INVENTION

It is an object of this invention to provide a coupling assembly which for a hose joint body and a tubular member such as a hose connecting end member or a small-diameter metal tube to thereby solve the above problems.

According to this invention, the hose joint body has a fluid bore extending therethrough, a connection wall at one end and defining a large diameter socket coaxial with the bore, and an annular groove concentric with the bore at the one end. It also includes an elastic seal ring having an annular V-like groove and fitted into the concentric annular groove in the joint body.

On the other hand, the tubular member comprises a hose coupling end member which includes a large-diameter tubular connection wall extending outwardly and to be fitted over the connection wall of the joint body, and an smaller tubular protrusion coaxial with the large diameter connection wall and extending in the same direction as the connection wall of the coupling end member. When coupled, the coupling end member is fitted at its connection wall over the connection wall of the joint body with its smaller tubular protrusion abutting the V-like groove on the joint body.

Alternatively, the tubular member may be a metal tube having an annular swelling at one end portion. When coupled, the metal tube is inserted at its end portion into the V-like groove on the joint body with its annular swelling abutting the inner periphery of the connection wall of the joint body. Before the metal tube is inserted into the V-like groove on the joint body, a second tube may be used to be inserted in common into the bore in the joint body and the metal tube and then the just-mentioned above coupling may by performed. Then the joint body and the metal tube end are held elastically by an elastic engagement member. A relatively small push force imparted by the elastic engagement member serves to apply a sufficient contact pressure to the metal tube to push same against the V-like groove in the joint body.

The structure in which the hose coupling end member is fitted over the joint body, the structure in which the metal tube abuts the inner periphery of the joint body or the structure in which the second tube is inserted in common into the metal tube and the joint body provides an automatic aligning function. Thus, mere pushing of the tubular member against the joint body will achieve their coupling easily and rapidly. There is no danger of the mechanical strength of the metal tube to be degraded due to its end coupling. Coupling can be performed even in a narrow place without the need for a coupling tool.

DETAILED DESCRIPTION OF THE PREFERRED EMBODIMENTS

Figure 1:
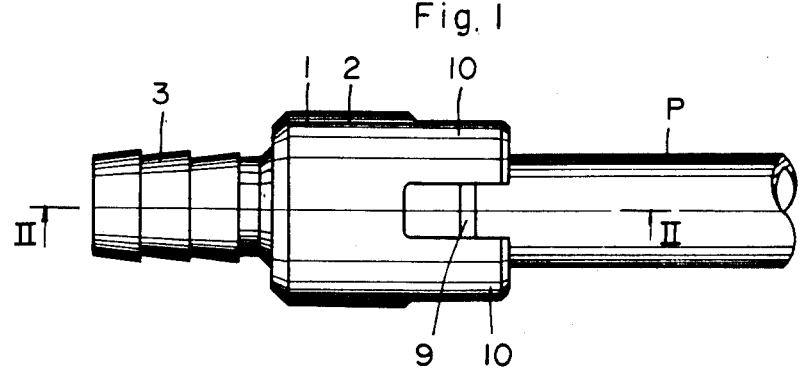
FIG. 1 is a plan view of one embodiment of a coupling assembly according to this invention.

FIGS. 1-4 show embodiments of this invention in which like portions are identified by like reference numeral.

Figure 2:
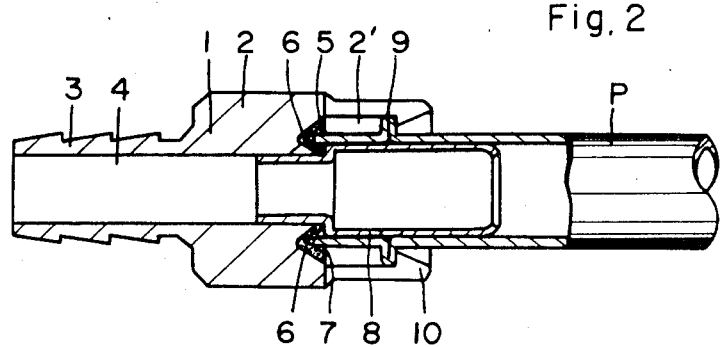
FIG. 2 is a cross-sectional view taken along the line II—II of FIG. 1.

First, in FIGS. 1 and 2, one coupling half or a joint body 1 has an axial fluid bore 4 extending therethrough, a tubular protrusion 3 provided at one end of the bore and adapted to be connected to a hose, and a connection wall 2 defining a large diameter socket 2' at the other end of the joint body. The socket 2' has an annular groove 5 coaxial with the axial bore 4. The annular groove 5 receives an elastic sealing 6, for example, of rubber, having a V-like groove 7 open to the right as viewed in FIG. 2. The joint body has a second tubular protrusion 8 on the side of socket 2' and integral with, or separated from, the joint body 1 and coaxial with axial bore 4. The other coupling half including a metal tube P at one end is fitted over the tubular protrusion 8 so that the tube is received at its end in the V-groove 7 in the seal ring 6 and that a collar 9 on the tube P is elastically and removably engaged and pushed axially by a plurality of tongue-like pawls 10 provided at the end of the connection wall 2.

In this embodiment, when coupled, the tube P is fitted at one end over the tube 8 protruding within the bore 2' while protrusion 8 is inserted at the other end into the joint body bore 4, and the metal tube P is received at the one end in the V-like groove 7 in the seal ring. Under this condition, the joint body 1 and the metal tube P are pushed axially against each other by the elastic engaging members for coupling purposes.

Figure 3:
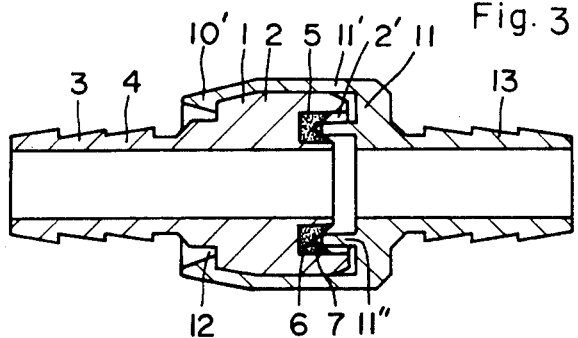
FIG. 3 is a view, similar to FIG. 2, of another embodiment of this invention.
Figure 4:
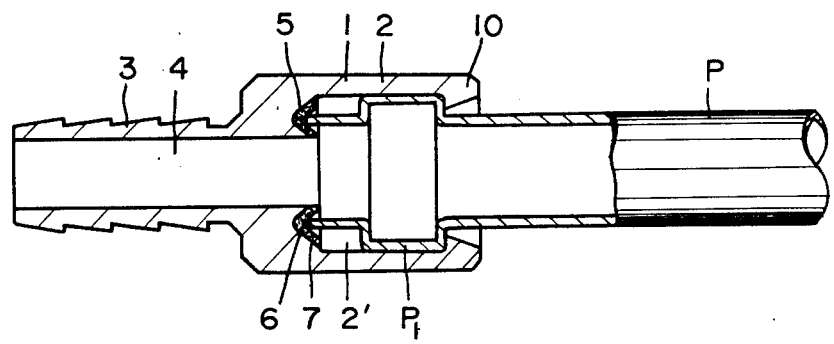
FIG. 4 is a view, similar to FIG. 2, of a further embodiment of this invention.
Figure 5:
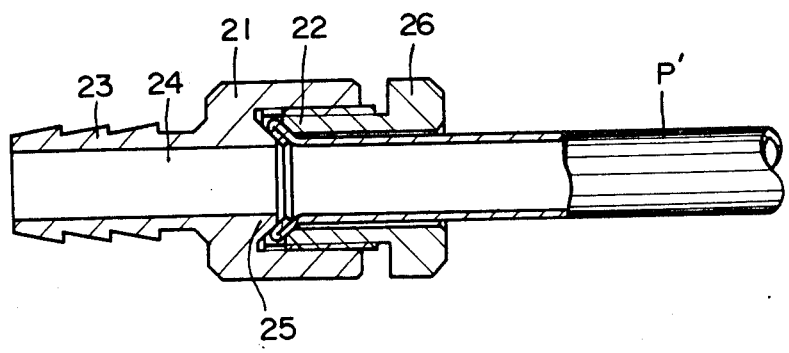
FIG. 5 is a view, similar to FIG. 2, of a prior art assembly.

FIGS. 3 and 4 show other embodiments of this invention. In the FIG. 3 embodiment, a short tubular protrusion 11″ provided on metal end member 11 as the other coupling half is engaged in V-like groove 7 in elastic seal ring 6 so that a cylindrical wall 11′ of hose coupling end member 11 is fitted over connection wall 2 of the joint body 1. In FIG. 4, connection wall 2 of the joint body 1 is fitted over a swelling P1 provided in the vicinity of the end of tube P so that tube P is engaged at one end in V-like groove 7 in the seal ring.

Further, in the FIG. 3 embodiment, a plurality of tongue-like pawls 10′ provided at the end member 11 and engaged in groove 12 provided on the outer peripheral surface of the joint body 1 serves to push the joint body and the tube P against each other in a removable manner. In the FIG. 4 embodiment, the pawl wall 10 elastically pushes the annular swelling wall P1, provided on tube P, in a removable manner, as in FIGS. 1 and 2.

In FIG. 3, a tubular protrusion 13 extending in the opposite direction in which the tubular wall 11′ of the end member 11 extends is adapted to be coupled to a hose In these embodiments, when coupled, the hose coupling end member 11 is fitted over the large-diameter connection wall 2 of the joint body 1, or the annular swelling wall P1 of metal tube P is caused to abut the inner peripheral surface of the connection wall so that the annular protrusion 11″ of the hose coupling end member 11 or the metal tube P is engaged in the corresponding V-like groove 7 of the seal ring. The joint 1 as one coupling half and the end member 11 or metal tube P as the other coupling body half are pushed axially against each other by elastic engaging means for coupling purposes.

We claim:
1. A coupling assembly comprising:
 a joint body having a central fluid bore extending therethrough and an annular groove provided thereon at one end of the bore and coaxial with the bore, an elastic seal ring inserted into the groove and having a V-like groove therein, a connecting wall extending from the end of said joint body at which the seal ring is disposed, and a pawl extending from said connecting wall;
 a metal tube having one end engaged in the V-like groove, said metal tube further comprising a collar at a location thereon spaced from said one end and being engaged by said pawl; and
 an aligning tube extending between said end of the joint body and the end of the metal tube and abutting the inner periphery of said metal tube and the central bore of the joint body, whereby the aligning tube automatically aligns the metal tube and the joint body so that the hollow space in the metal tube aligns with the bore in the joint body.

* * * * *